(12) United States Patent
Benner

(10) Patent No.: US 8,854,630 B2
(45) Date of Patent: Oct. 7, 2014

(54) POSITION-MEASURING DEVICE

(75) Inventor: Ulrich Benner, Trostberg (DE)

(73) Assignee: Dr. Johannes Heidenhain GmbH, Traunreut (DE)

( * ) Notice: Subject to any disclaimer, the term of this patent is extended or adjusted under 35 U.S.C. 154(b) by 539 days.

(21) Appl. No.: 13/203,688

(22) PCT Filed: Feb. 3, 2010

(86) PCT No.: PCT/EP2010/051290
§ 371 (c)(1),
(2), (4) Date: Aug. 26, 2011

(87) PCT Pub. No.: WO2011/044027
PCT Pub. Date: Apr. 14, 2011

(65) Prior Publication Data
US 2012/0081711 A1    Apr. 5, 2012

(30) Foreign Application Priority Data
Mar. 2, 2009   (DE) .................. 10 2009 001 262

(51) Int. Cl.
*G01B 11/14*     (2006.01)
*G01B 11/00*     (2006.01)
*G01D 5/347*     (2006.01)

(52) U.S. Cl.
CPC ............ *G01B 11/00* (2013.01); *G01D 5/34715* (2013.01)
USPC ...................................................... 356/614

(58) Field of Classification Search
USPC ........ 356/614–622, 499; 250/231.13–231.18, 250/237 G, 559.29; 33/706–707
See application file for complete search history.

(56) References Cited

U.S. PATENT DOCUMENTS

| | | | |
|---|---|---|---|
| 7,057,160 B2 | 6/2006 | Ito | |
| 7,220,960 B2 | 5/2007 | Ito | |
| 7,473,886 B2 | 1/2009 | Benner | |
| 7,705,289 B2 | 4/2010 | Benner | |
| 2003/0142288 A1 | 7/2003 | Kinrot et al. | |
| 2004/0155178 A1* | 8/2004 | Ito | ............. 250/231.13 |
| 2005/0023450 A1 | 2/2005 | Ito | |
| 2007/0262250 A1* | 11/2007 | Benner | ............. 250/231.13 |

FOREIGN PATENT DOCUMENTS

| | | |
|---|---|---|
| CN | 101067560 | 11/2011 |
| DE | 10 2006 021 017 | 11/2007 |
| DE | 10 2007 028 943 | 12/2008 |

(Continued)

OTHER PUBLICATIONS

International Search Report, issued in corresponding International Application No. PCT/EP2010/051290.

(Continued)

*Primary Examiner* — Kara E Geisel
*Assistant Examiner* — Dominic J Bologna
(74) *Attorney, Agent, or Firm* — Kenyon & Kenyon LLP

(57) ABSTRACT

A position-measuring device is suited for detecting the relative position of a scanning unit and a reflection measuring grating movable relative thereto in at least one measuring direction. The scanning unit includes a primary light source as well as at least one detector assembly in a detection plane. A periodic configuration of point light sources is able to be generated in the detection plane from the primary light source. The primary light source is disposed above the detection plane.

15 Claims, 7 Drawing Sheets

(56) References Cited

FOREIGN PATENT DOCUMENTS

| EP | 1 852 684 | 11/2007 |
|----|-----------|---------|
| JP | 2005-043192 | 2/2005 |
| JP | 2007-298522 | 11/2007 |
| JP | 2008-064704 | 3/2008 |

OTHER PUBLICATIONS

Written Opinion, issued in corresponding International Application No. PCT/EP2010/051290.
Chinese Search Report, issued in corresponding Chinese Patent Application No. 201080010169.5.

* cited by examiner

POSITION-MEASURING DEVICE

FIELD OF THE INVENTION

The present invention relates to a position-measuring device.

BACKGROUND INFORMATION

A position-measuring device is described, for example, in U.S. Patent Application Publication No. 2005/023450. In addition to a measuring grating, e.g., taking the form of a linear reflection measuring grating, it includes a scanning unit displaceable relative thereto in at least one measuring direction. Provided on the side of the scanning unit are a primary light source as well as at least one detector assembly in the form of a periodic detector array. In the event a spatially extended primary light source is used, a periodic configuration of point light sources is able to be generated in the detection plane by disposing what is termed a transmitting grating in this plane. The transmitting grating is made up of a periodic arrangement of light-transmitting and opaque regions in the measuring direction.

In the event of the relative movement of the scanning unit and measuring grating, a stripe pattern, modulated as a function of the displacement, results in the detection plane and is detected by the detector assembly and converted into scanning signals able to be further processed. In this context, because the detector assembly is in the form of a periodic detector array, a plurality of phase-shifted scanning signals is generated in customary manner.

In such systems, as a rule, the aim is for the primary light source used and the detector assembly employed to be situated in the same plane to the greatest extent possible. This ensures that the distance between the primary light source and the measuring grating is identical to the distance between the measuring grating and the detector assembly. To that end, the primary light source according to U.S. Patent Application Publication No. 2005/023450 is situated below the transmitting grating in a central cavity in a carrier substrate. The cavity is surrounded by the detector elements of the detector array. However, such a configuration is associated with significant manufacturing costs. Thus, the carrier substrate must be formed with a suitable cavity; in addition, the contacting of the primary light source in the cavity proves to be relatively difficult.

Therefore, German Published Patent Application No. 10 2006 021 017 describes placing the primary light source at a different location in the scanning unit. In the scanning beam path, a suitable reflector element is provided, via which the primary light source is imaged into a virtual light source in the detection plane. In this manner, the formation of a cavity may be avoided, and more varied possibilities are obtained for placing the primary light source in the scanning unit.

The measures described in German Published Patent Application No. 10 2006 021 017 are suited for solving the problems in connection with the cavity if point light sources, for instance, what are referred to as VCSEL light sources, are used as primary light sources. If such point light sources are not available and spatially extended primary light sources, e.g., LEDs, must be used, then the measures described in German Published Patent Application No. 10 2006 021 017 are not sufficient to ensure reliable generation of position-dependent scanning signals.

SUMMARY

Example embodiments of the present invention provide a position-measuring device in which extended primary light sources may be used, and at the same time, easy manufacture of the scanning unit is ensured. In so doing, the placement of the primary light source in a cavity is to be avoided to the greatest extent possible.

According to example embodiments of the present invention, it is provided to dispose the primary light source above the detection plane. In this manner, various possibilities are obtained as to how a periodic configuration of point light sources is able to be generated in the detection plane, even if an extended primary light source is used.

In particular, due to the measures described herein, the formation of a cavity in the carrier substrate may be avoided. Because of the markedly simplified production of the scanning unit, this offers advantages with regard to manufacturing costs. Thus, the scanning unit may be manufactured in automated fashion, e.g., in what are called wafer-level-packaging methods, which is attributable to the placement of the primary light source above the detection plane. Furthermore, without a requisite cavity, a basically higher reliability of the detector assembly also results.

In example embodiments, a transmitting grating is disposed in front of the primary light source in the direction of the propagation direction of the beams of rays emitted by the primary light source. Furthermore, between the transmitting grating and the at least one detector assembly, at least one optical element is disposed, via which the transmitting grating is imaged into the periodic configuration of point light sources in the detection plane.

In the scanning unit, an optics module, made up of a transparent carrier substrate into which the transmitting grating and the at least one optical element are integrated, may be disposed above the detector assembly.

In this context, the transmitting grating and the at least one optical element may be placed on the upper side and/or lower side of the carrier substrate.

In example embodiments of the present invention, the transmitting grating is placed on the upper side of the carrier substrate. The primary light source, which emits in the direction of the transmitting grating, is disposed above the transmitting grating, while at least one optical element is placed on the lower side of the carrier substrate.

In this case, at least one further optical element may be disposed on the upper side of the carrier substrate in an area which is not occupied by the transmitting grating.

In example embodiments of the present invention, the carrier substrate is situated at a defined distance above the detector assembly. The primary light source is placed between the detector assembly and the carrier substrate and emits in the direction of the carrier substrate, while the transmitting grating is disposed on the lower side of the carrier substrate and at least one optical element is positioned on the upper side of the carrier substrate.

In this case, at least one further optical element may be disposed on the lower side of the carrier substrate in an area which is not occupied by the transmitting grating.

The optical element may take the form of a refractive or diffractive optical element.

In example embodiments of the present invention, it is possible to form the optical element as a grating structure at the upper side and/or lower side of the carrier substrate.

Preferably, the imaging of the transmitting grating into a periodic configuration of point light sources in the detection plane takes place in a central area of the detection plane in which no detector assembly is placed.

In the position-measuring device according to an example embodiment of the present invention, the reflection measuring grating includes a periodic incremental graduation extending in the measuring direction. The transmitting grating is in the form of a periodic grating, and the periodic configuration of point light sources in the detection plane has a periodicity which corresponds to double the periodicity of the incremental graduation.

In the position-measuring device according to an example embodiment of the present invention, the reflection measuring grating includes a periodic incremental graduation extending in the measuring direction. The transmitting grating takes the form of a periodic grating having a periodicity according to $P_{SG}=2 \cdot P_M/\beta$, where $P_{SG}$:=periodicity of the transmitting grating,
$P_M$:=periodicity of the incremental graduation,
$\beta$:=image scale of the optical element.

In the position-measuring device according to an example embodiment of the present invention, an optics module that includes a transparent carrier substrate is positioned in the scanning unit above the detector assembly. The primary light source, which emits in the direction of the detector assembly, is situated on the upper side of the carrier substrate, while a periodic reflection grating, by which the periodic configuration of point light sources is formed, is disposed in the detection plane.

The primary light source may take the form of a spatially extended light source.

Further features and aspects of example embodiments of the present invention are explained in more detail below with reference to the figures.

BRIEF DESCRIPTION OF THE DRAWINGS

FIG. 1b shows a top view of the scanning unit of the position-measuring device from FIG. 1a;

FIGS. 2b, 2c show views of the upper side and lower side, respectively, of the optics module from FIG. 2a;

FIG. 3a shows a schematic view of an alternative variant of an optics module as may be used in the position-measuring device from FIG. 1a;

FIG. 3b shows a top view of the optics module from FIG. 3a;

FIG. 4b shows a top view of the scanning unit of the position-measuring device from FIG. 4a;

FIG. 6b shows a top view of the scanning unit of the position-measuring device from FIG. 6a.

DETAILED DESCRIPTION

Figure 1A:
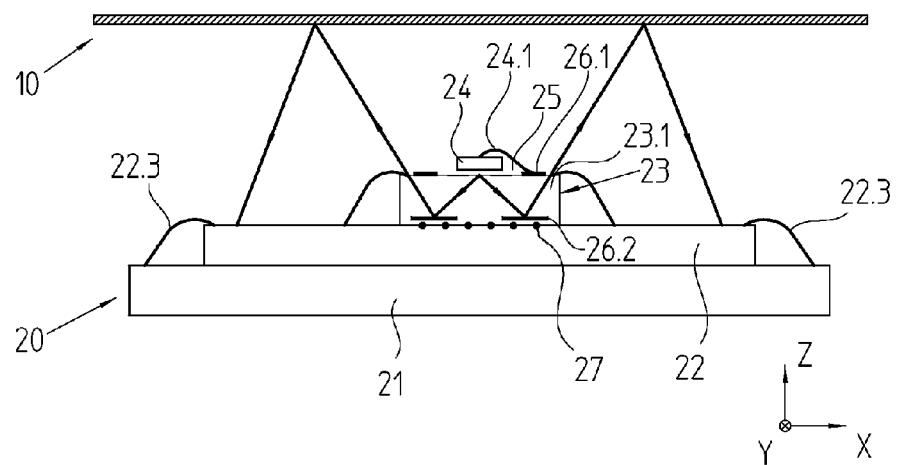
FIG. 1a shows a schematic lateral view of a position-measuring device according to an example embodiment of the present invention.
Figure 1B:
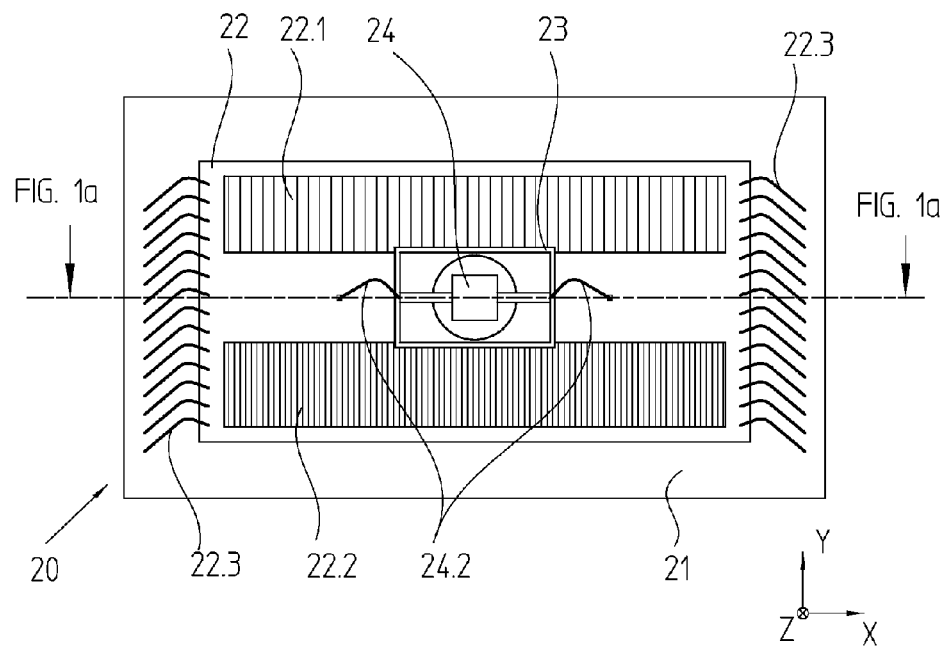
Figure 2A:
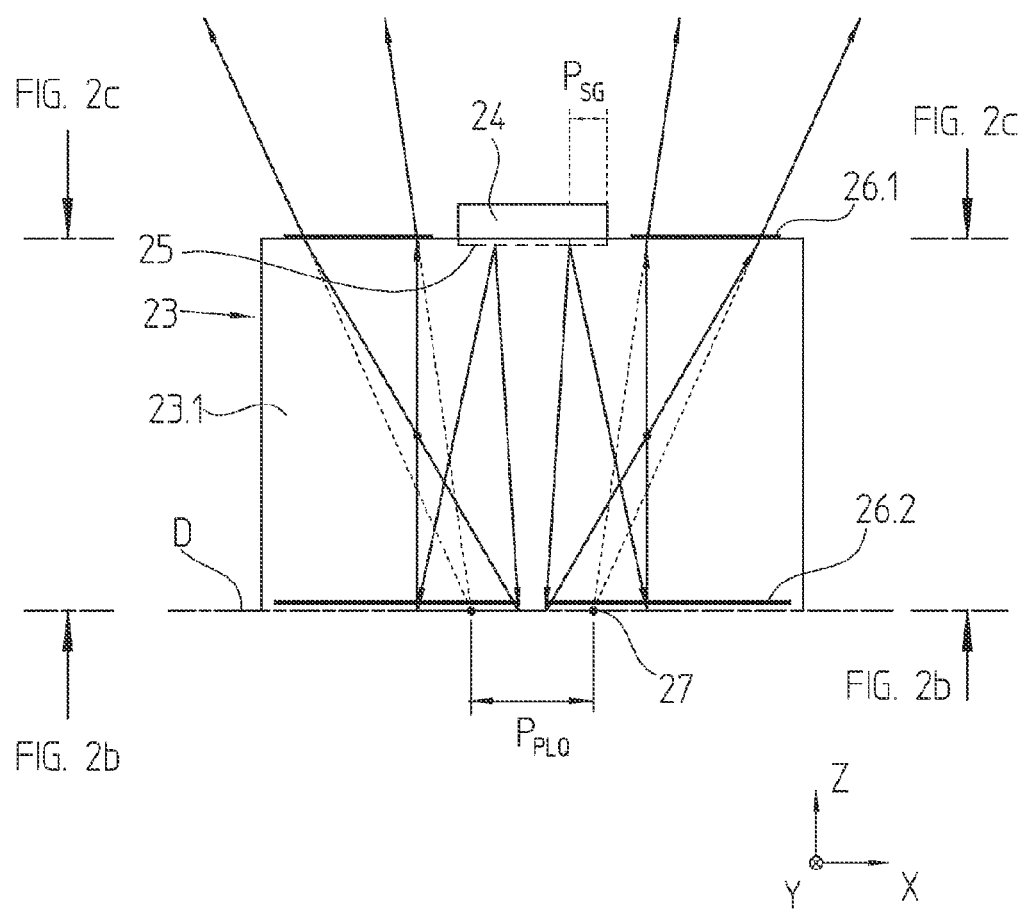
FIG. 2a shows an enlarged view of the optics module from FIG. 1 in order to clarify the path of the image rays for generating the periodic configuration of point light sources.
Figure 2B:
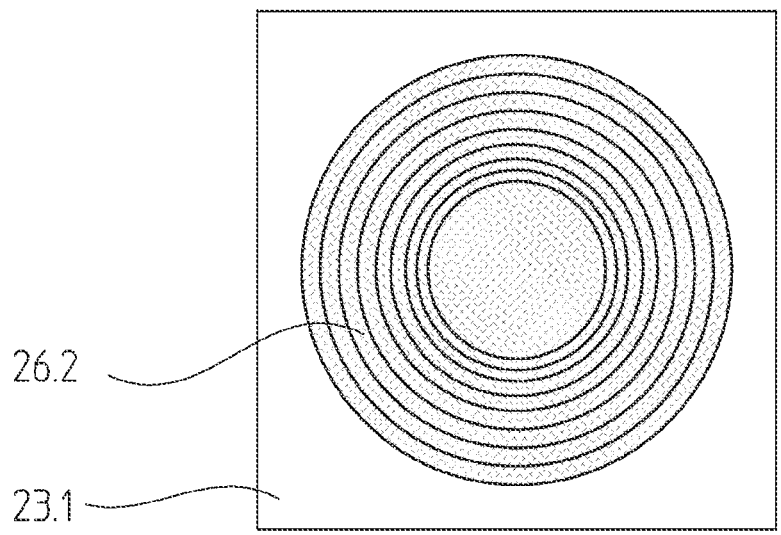
Figure 2C:
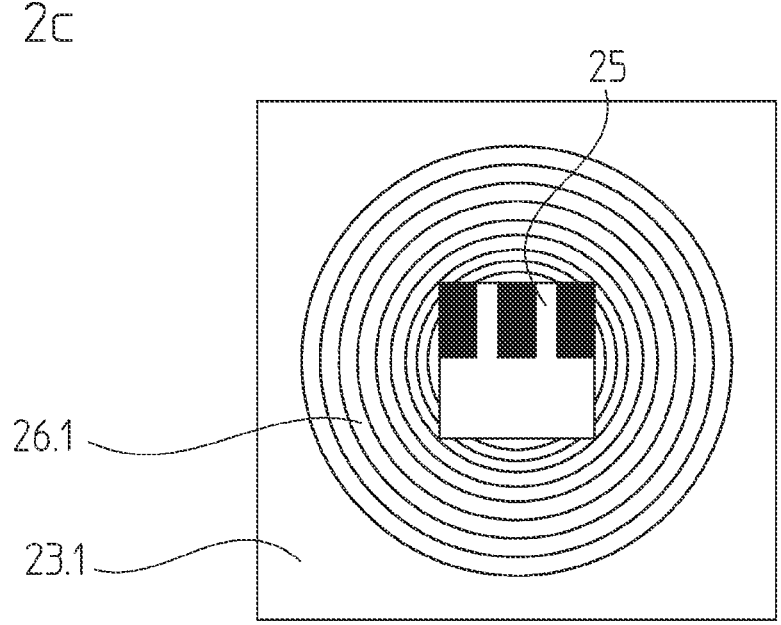

In the following, a position-measuring device according to an example embodiment of the present invention is explained with reference to FIGS. 1a, 1b and 2a-2c. FIG. 1a shows a schematic lateral view of parts of scanning unit 20 and of reflection measuring grating 10 including the scanning beam path; FIG. 1b shows a top view of scanning unit 20 from FIG. 1a; FIG. 2a shows an enlarged view of the optics module from FIG. 1 in order to clarify the beam path for generating the periodic configuration of point light sources in the detection plane; FIGS. 2b and 2c show views of the upper side and lower side of the optics module.

In the example shown, the position-measuring device includes a scanning unit 20 which is disposed opposite a reflection measuring grating 10 in a manner allowing movement in measuring direction x. For example, reflection measuring grating 10 and scanning unit 20 are connected to two objects displaceably disposed relative to each other in measuring direction x, for instance, two machine parts movable relative to each other. A downstream control unit (not shown) is able to control the movement of these machine parts, e.g., in a conventional manner, based on the position-dependent output signals of the position-measuring device.

In the example shown, reflection measuring grating 10 has a track having a periodic incremental graduation extending in measuring direction x, as well as a track parallel thereto, having a pseudo-random coding for the absolute-position detection. Both tracks are situated on a suitable graduated-scale carrier, e.g., a steel substrate.

The track having the incremental graduation includes subareas disposed periodically in measuring direction x and having different optical reflective properties. In this context, let us say the width of two successive, different subareas in measuring direction x is denoted as periodicity $P_M$ of the incremental graduation; for instance, $P_M=20\,\mu m$ is selected in the present example. The subareas extend in the graduation plane in a direction perpendicular to measuring direction x, i.e., in the indicated y-direction. In example embodiments, the subareas have different phase-shifting effects on the beams of rays reflected by them. Consequently, in this example, reflection measuring grating 10 takes the form of what is referred to as a reflection phase grating. In principle, other variations are also possible for the reflection measuring grating.

The track having the pseudo-random coding includes subareas disposed aperiodically in the measuring direction and having different optical reflective properties Only one part of scanning unit 20 is discernible in the highly schematic representation in FIGS. 1a and 1b; usually scanning unit 20 also includes a suitable housing in which its various components are situated. For reasons of clarity, only the elements necessary for explanation are shown in the figures.

On the side of scanning unit 20, a detector unit 22 having two detector assemblies 22.1, 22.2 is placed on a support board 21. A first detector assembly 22.1 is used for scanning a periodic stripe pattern in the detection plane and for generating a plurality of phase-shifted incremental signals. Incidentally, in the example shown, detection plane D coincides with the upper side of detector unit 22. The scanned stripe pattern results from the optical scanning of the incremental graduation on reflection measuring grating 10. First detector assembly 22.1 includes a, e.g., conventional, detector array, having a periodic arrangement of individual detector elements or photodiodes in measuring direction x. A second detector assembly 22.2 acts in, e.g., a conventional manner for scanning the pseudo-random coding of the second track projected into the detection plane. The generation of at least one absolute-position signal is possible via second detector assembly 22.2. For the sake of simplicity, the incremental signals and absolute-position signals generated in this manner are denoted hereinafter only as position signals.

In the present example embodiment of the position-measuring device, both detector assemblies 22.1, 22.2 are electrically contacted, i.e., electroconductively connected via bonding wires 22.3 to conductor tracks (not shown) in support board 21.

Above detector assemblies 22.1, 22.2, an optics module 23 is disposed in scanning unit 20 in a central subarea of detector assemblies 22.1, 22.2, the optics module being made of a platelike, transparent carrier substrate 23.1, in which various optical components, yet to be explained, are integrated. In the present example, optics module 23 takes up only a portion of the total surface area of detector assembly/assemblies 22.1, 22.2, or of the surface of detector unit 22, as is apparent from FIG. 1b.

On the upper side of carrier substrate 23.1, which is facing reflection measuring grating 10, a primary light source 24 is placed in optics module 23. Preferably, a spatially extended light source acts as primary light source 24. For example, it may be an LED taking the form of a semiconductor chip. Primary light source 24 is electrically contacted via further bonding wires 24.1, which are connected on the upper side of carrier substrate 23.1 to corresponding contacts. These contacts are connected to conductor tracks (not shown) in detector unit 22 via bonding wires 24.1.

The radiation-emitting area of primary light source 24 is oriented in the direction of the lower side of carrier substrate 23.1, that is, in the direction of the side of carrier substrate 23.1 facing away from reflection measuring grating 10. Consequently, primary light source 24 radiates away from reflection measuring grating 10 in the direction of the lower side of carrier substrate 23.1.

On the upper side of carrier substrate 23.1, a periodic transmitting grating 25 is disposed, which is formed as a transmitted-light amplitude grating having periodicity $P_{SG}$; in one possible exemplary embodiment, periodicity $P_{SG}$ is selected according to $P_{SG}=240$ μm. Transmitting grating 25 is disposed in such a way that it is placed in the beam path of the beams of rays emitted by primary light source 24.

Moreover, various optical elements 26.1, 26.2, which are located in the scanning beam path between transmitting grating 25 and detector assemblies 22.1, 22.2, and which assume defined optical functions, are disposed on the upper side and lower side of carrier substrate 23.1. Thus, in the present exemplary embodiment, a periodic configuration of point light sources 27 is generated from primary light source 24 by way of optical elements 26.1, 26.2, as indicated schematically in FIGS. 1a and 2. To that end, transmitting grating 25 is imaged virtually via optical elements 26.1, 26.2 into detection plane D having detector assemblies 22.1, 22.2; further details concerning the imaging taking place are explained in the following with reference to FIG. 2. A virtual transmitting-grating image, i.e., a periodic configuration of point light sources 27 having periodicity $P_{PLQ}$, results in detection plane D via the transmitting-grating imaging. Based on the scanning principle used, the following must hold true for periodicity $P_{PLQ}$:

$$P_{PLQ}=2 \cdot P_M \quad \text{(equation 1)}$$

where
$P_{PLQ}$:=periodicity of the configuration of point light sources,
$P_M$:=periodicity of the incremental graduation.

The periodic configuration of point light sources 27 then acts as actual light source or plurality of light sources for the scanning of reflection measuring grating 10. To that end, as shown in FIG. 1a, the beams of rays emitted by the periodic configuration of point light sources 27 strike reflection measuring grating 10, are reflected back there in the direction of scanning unit 20, and in scanning unit 20 ultimately arrive at detector assemblies 22.1, 22.2 placed in the detection plane. Displacement-dependent position signals result there in the event of the relative movement of scanning unit 20 and reflection measuring grating 10. In the case of the incremental signals, a periodic stripe pattern is generated in detection plane D via the scanning beam path described and the interactions of the beams of rays with reflection measuring grating 10 thereby resulting. In response to a relative movement taking place between scanning unit 20 and reflection measuring grating 10, this stripe pattern is modulated as a function of the displacement and is converted in, e.g., conventional manner via detector assembly 22.1 into a plurality of phase-shifted incremental signals for further processing.

The placement of spatially extended primary light source 24 used, above detection plane D is decisive in this example embodiment of the position-measuring device, as well as in the alternatives yet to be explained. In this exemplary embodiment, transmitting grating 25 is thereby able to be imaged into a virtual transmitting-grating image, i.e., into a periodic configuration of point light sources 27 in detection plane D by optical elements 26.1, 26.2 in optics module 23.

The path of the image rays for the imaging of two transparent subareas of transmitting grating 25 in optics module 23 into detection plane D is shown in schematic form in FIG. 2a. First of all, the beams of rays emitted by primary light source 24 arrive at transmitting grating 25, situated at the upper side of carrier substrate 23.1, which, as mentioned above, is in the form of a transmission amplitude grating having the periodicity $P_{SG}=240$ μm. The beams of rays subsequently pass through carrier substrate 23.1 and arrive at optical elements 26.2 situated at the lower side of carrier substrate 23.1. In this context, optical elements 26.2 are implemented as diffractive optical elements in the form of grating structures in carrier substrate 23.1, namely, as reflection gratings. FIG. 2b shows a view of the lower side of optics module 23, that is, of carrier substrate 23.1, with the axially symmetrical, reflective, diffractive structures, i.e., optical element 26.2, placed there. These optical elements 26.2 reflect the beams of rays back in the direction of the upper side of carrier substrate 23.1 into subareas which are not occupied by transmitting grating 25, and in which further optical elements 26.1 are situated. Optical elements 26.1 on the upper side are likewise formed as diffractive optical elements, namely, as transmittive grating structures in carrier substrate 23.1 These grating structures or optical elements 26.1, which likewise are again disposed in axially symmetrical fashion with respect to the primary light source, are discernible in FIG. 2c. In FIG. 2c, transmitting grating 25 may be seen in the central area of the upper side of carrier substrate 23.1. Adjacent to transmitting grating 25, an area is provided on the upper side of carrier substrate 23.1, which is used to scan the PRC track of the reflection measuring grating. From the grating structures on the upper side of optics module 23, there is a reflection once more back in the direction of the lower side of carrier substrate 23.1. Resulting there in detection plane D are ultimately two virtual images of the two transparent subareas of transmitting grating 25, that is, the periodic configuration of point light sources 27, of which only two are shown in FIG. 2 for reasons of better clarity. As mentioned, the periodicity of this configuration 27 is denoted by $P_{PLQ}$.

In the scanning principle used, for the generating of incremental signals, according to equation (1), the periodicity of the virtual transmitting-grating image, that is, periodicity $P_{PLQ}$ of the configuration of point light sources 27, must correspond to double the periodicity $P_M$ of reflection measuring grating 10. In order to satisfy this boundary condition, for the imaging of transmitting grating 25, the following equation (2) is obtained for periodicity $P_{SG}$ of transmitting grating 25, if image scale 13 of optical elements 26.1, 26.2 is given:

$$P_{SG} = 2 \cdot P_M / \beta, \qquad (2)$$

where:
$P_{SG}$:=periodicity of the transmitting grating,
$P_M$:=periodicity of the incremental graduation,
$\beta$:=image scale of the optical element.

Analogous to these considerations for the case of the scanning of the periodic incremental graduation, naturally, certain requirements also arise for the scanning of the aperiodic structures in the PRC track of the reflection measuring grating. In order to image the spatially extended primary light source into a virtual point light source, a slit having the width b in the measuring direction is disposed in front of the primary light source, and is imaged via one or more optical elements into the detection plane. Consequently, the slit acts here as transmitting grating. If, let us say, in the PRC track, the extension of the smallest subarea in the measuring direction is denoted by $P_{PRC}$, then, applying the considerations above, the extension of the virtual point light source in the detection plane in measuring direction x is allowed to amount to twice as much as $P_{PRC}$ at maximum. In the same way, analogous to the considerations above, a requisite width b of the slit then results according to equation (3) at:

$$b = P_{PRC} / \beta, \qquad (3)$$

where:
b: =width of the slit in the measuring direction,
$P_{PRC}$:=extension of the smallest subarea of the PRC track in the measuring direction,
$\beta$:=image scale of the optical element.

Figure 3A:
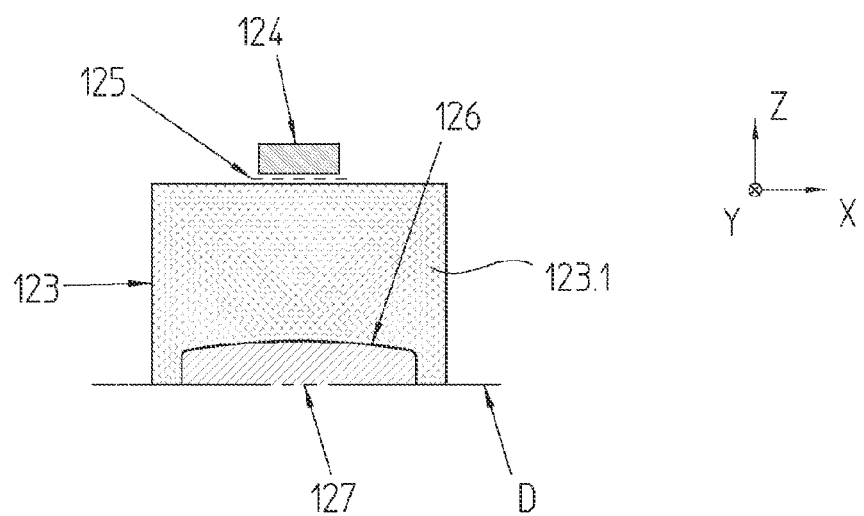
Figure 3B:
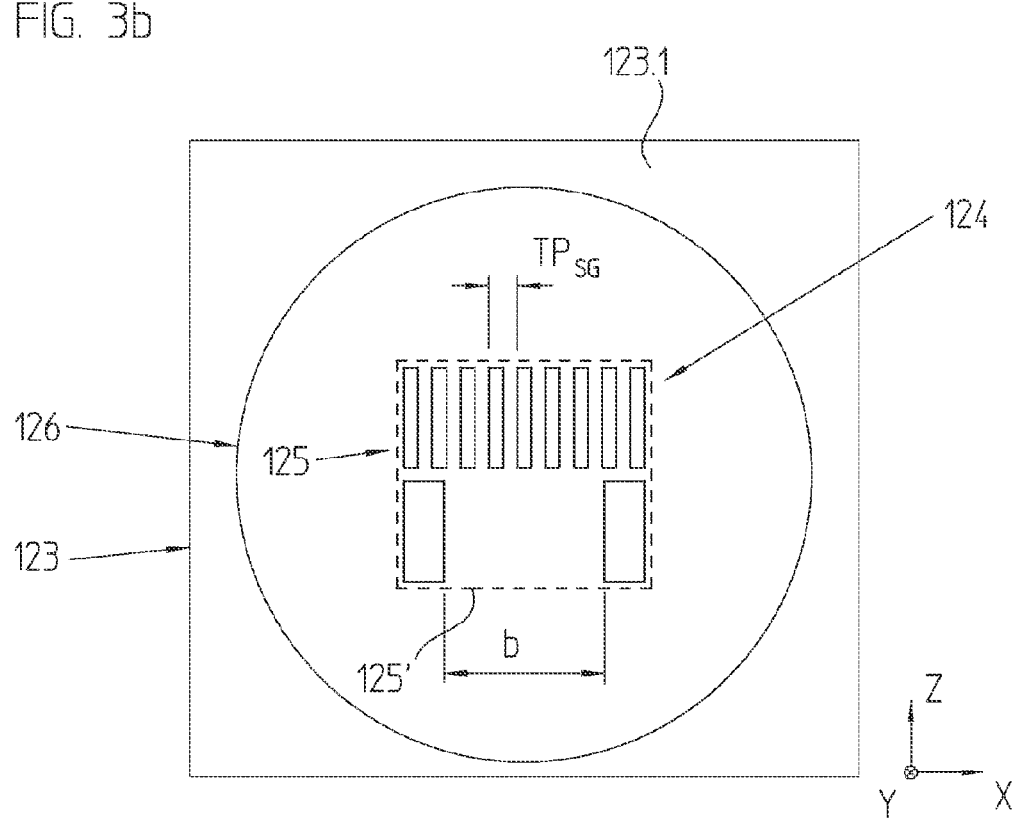

With the aid of FIGS. 3a and 3b, in the following, an alternative variant of an optics module is described, which may be used in the position-measuring device. FIG. 3a shows a schematic sectional view of optics module 123; FIG. 3b shows a top view of optics module 123. In the following, only the important differences with respect to the optics module explained above are described.

Instead of carrying out the virtual imaging of transmitting grating 125 in front of primary light source 124 via various optical elements in the form of diffractive grating structures, in this variant of optics module 123, it is provided to form optical element 126 as a refractive optical element at the lower side of carrier substrate 123.1. To that end, a reflector element, integrated into carrier substrate 123.1, is provided, which is formed specifically as a mirror having a defined curvature. The side of optical element 126 facing primary light source 124 is therefore reflecting. By suitable dimensioning of this mirror, a virtual image of the transmitting grating, that is, a periodic configuration of point light sources 127, is in turn able to be generated in detection plane D by the resulting imaging.

In the schematic top view of optics-module variant 123 in FIG. 3b, the position of spatially extended primary light source 124 on the upper side of carrier substrate 123.1 is indicated with a dashed line. Also discernible in FIG. 3b is transmitting grating 125, used for the incremental scanning and having periodicity $TP_{SG}$, which is situated in front of the light-emitting surface of the primary light source on the upper side of carrier substrate 123.1. Adjacent to transmitting grating 125 in the y-direction, a slit 125' having width b is located on the upper side of carrier substrate 123.1. As explained previously, slit 125' is used for limiting size when imaging spatially extended primary light source 124 into a virtual point light source in detection plane D in the course of scanning the aperiodic PRC track of the reflection measuring grating.

As in the preceding exemplary embodiment, the variant of optics module 123 shown in FIGS. 3a and 3b is disposed above the detector unit, that is, above the detector assemblies in the scanning unit of the position-measuring device.

Figure 4A:
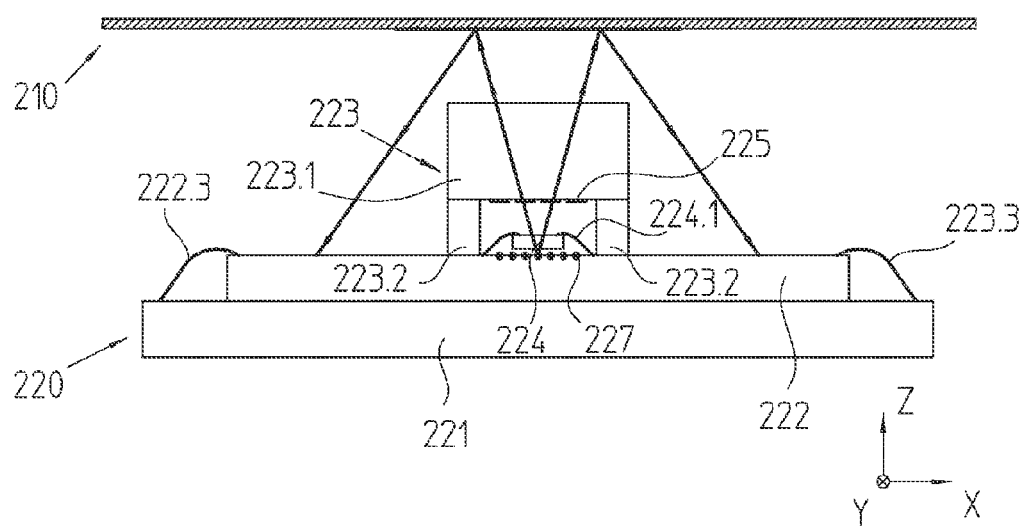
FIG. 4a shows a schematic lateral view of a position-measuring device according to an example embodiment of the present invention.
Figure 4B:
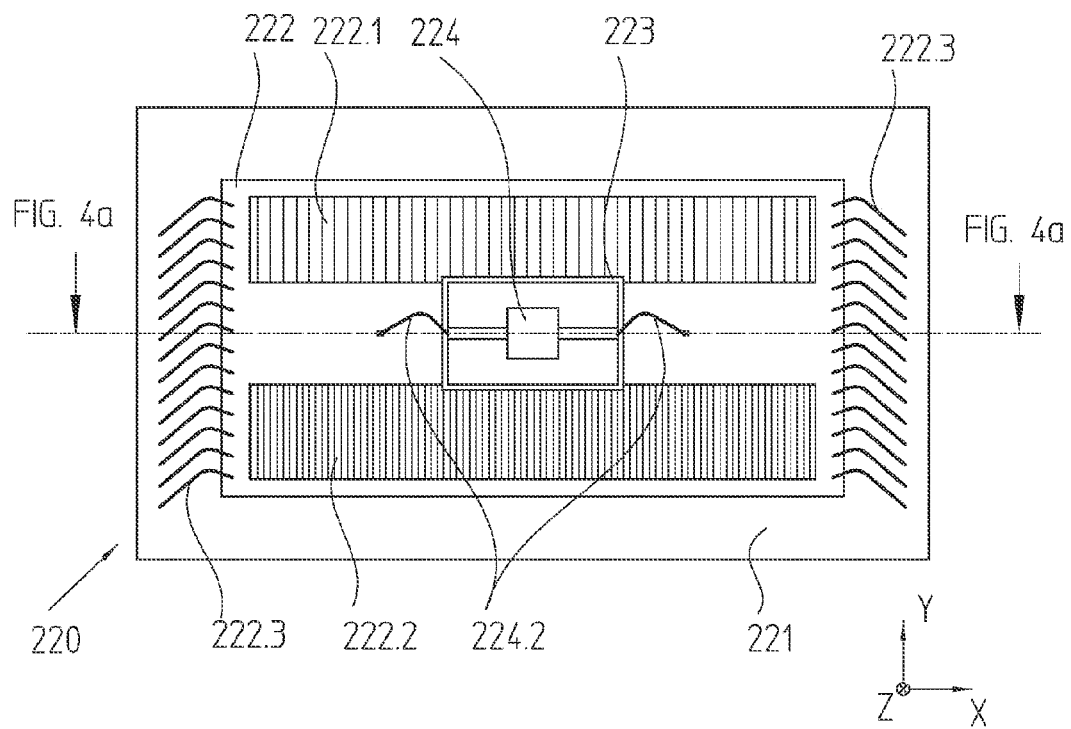

A position-measuring device according to an example embodiment of the present invention is explained in the following with reference to FIGS. 4a, 4b and 5; they show representations or views of this example embodiment analogous to the first exemplary embodiment. Once again, only the important differences with respect to the first exemplary embodiment are explained; otherwise, reference is made to the description of FIGS. 1a, 1b and 2.

The important differences with respect to the first exemplary embodiment lie in the placement of primary light source 224, as well as in the placement and form of optics module 223. However, as in the first exemplary embodiment, it is provided, inter alia, to place primary light source 224 above detection plane D, which coincides with the upper side of detector unit 222 in this variant, as well.

Optics module 223, i.e., carrier substrate 223.1 of the optics module, is now, however, disposed at a defined distance above detector assemblies 222.1, 222.2, and therefore at a defined distance above detection plane D. To that end, in scanning unit 220, spacer elements 223.2 are provided on unused areas of the upper side of detector unit 222, which bear carrier substrate 223.1. In addition, primary light source 224 is disposed between detector assemblies 222.1, 222.2 and carrier substrate 223.1 of optics module 223 on the upper side of detector unit 222. Primary light source 224 emits in the direction of carrier substrate 223.1 of optics module 223. A periodic transmitting grating 225, again provided, is situated on the lower side of carrier substrate 223.1, which is oriented in the direction of detector assemblies 222.1, 222.2, or of detector unit 222. As in the first exemplary embodiment, transmitting grating 225 is imaged into a virtual transmitting-grating image, that is, into a periodic configuration of point light sources 227 in detection plane D by way of optical elements in optics module 223, which are yet to be explained below.

Figure 5:
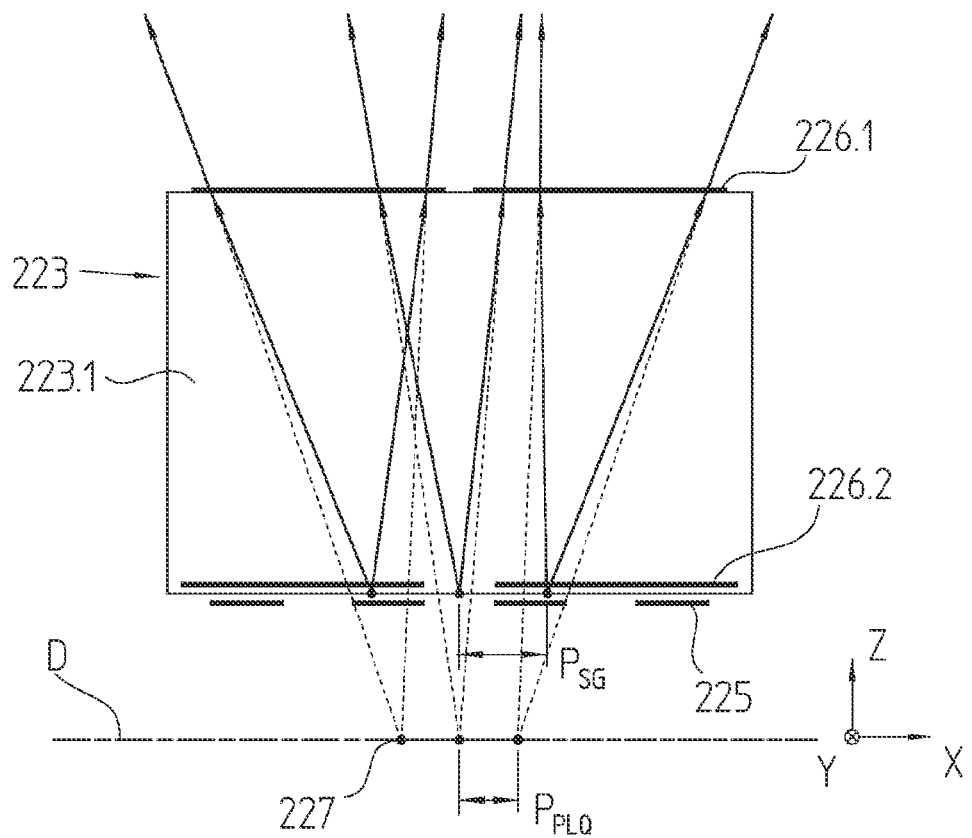
FIG. 5 shows an enlarged view of the optics module from FIG. 4a in order to clarify the beam path for generating the periodic configuration of point light sources.

The associated path of the image rays for generating the virtual transmitting-grating image is again shown in schematized fashion in FIG. 5. The paths of the image rays of three transparent subareas of transmitting grating 225 are illustrated, which are imaged via optical elements 226.1, 226.2 into a periodic configuration of point light sources 227 in detection plane D. As in the example above, optical elements 226.1, 226.2 between transmitting grating 225 and detection plane D are implemented in carrier substrate 223.1 of optics module 223 as diffractive optical elements in the form of reflection gratings or transmission gratings.

Figure 6A:
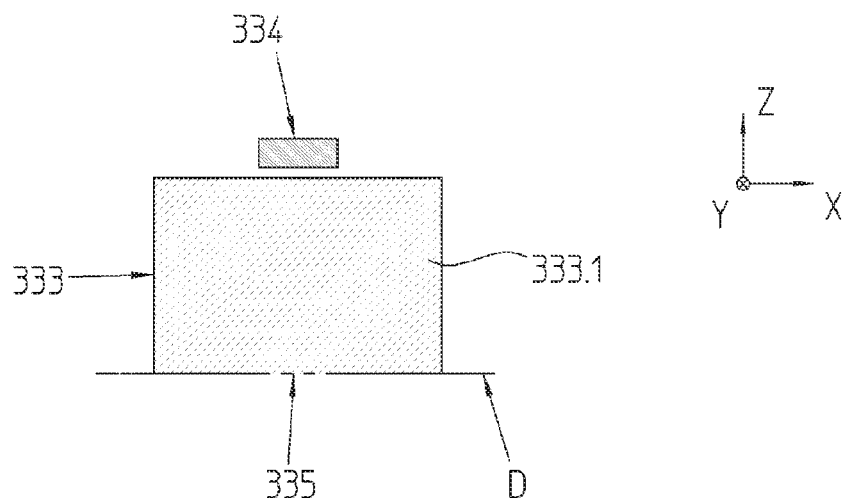
FIG. 6a shows a schematic lateral view of a position-measuring device according to an example embodiment of the present invention.

Finally, a position-measuring device according to an example embodiment of the present invention is explained with reference to FIGS. 6a and 6b. In representation analogous to the previous variants, they show only optics module 333, used in the scanning unit, in a lateral sectional view, as well as in a top view. As in the first example embodiment, optics module 333 is disposed with its lower side directly on the detector unit having the detector assemblies, that is, the lower side of the carrier substrate is located in detection plane D.

As in the examples previously described, it is also provided in this variant to place primary light source 334 above detection plane D. Similarly as in the first example, spatially extended primary light source 334 is placed on the upper side of carrier substrate 333.1 of the optics module, and emits in the direction of detection plane D of the scanning unit. In this example embodiment, a periodic reflection grating 335 is now integrated into the lower side of carrier substrate 333.1. Since, as mentioned, in this case, the lower side of carrier substrate 333.1 coincides with detection plane D, periodic reflection grating 335 having periodicity $P_{SG}$ is therefore effectively situated in detection plane D. Consequently, in this exemplary embodiment, the periodic configuration of point light sources is formed in detection plane D by periodic reflection grating 335 effectively placed there. Therefore, imaging of a real transmitting grating into a virtual transmitting-grating image via suitable optical elements, as in the previous examples, is not necessary in this example embodiment in order to ensure the necessary scanning prerequisites in the case of a spatially extended primary light source.

Figure 6B:
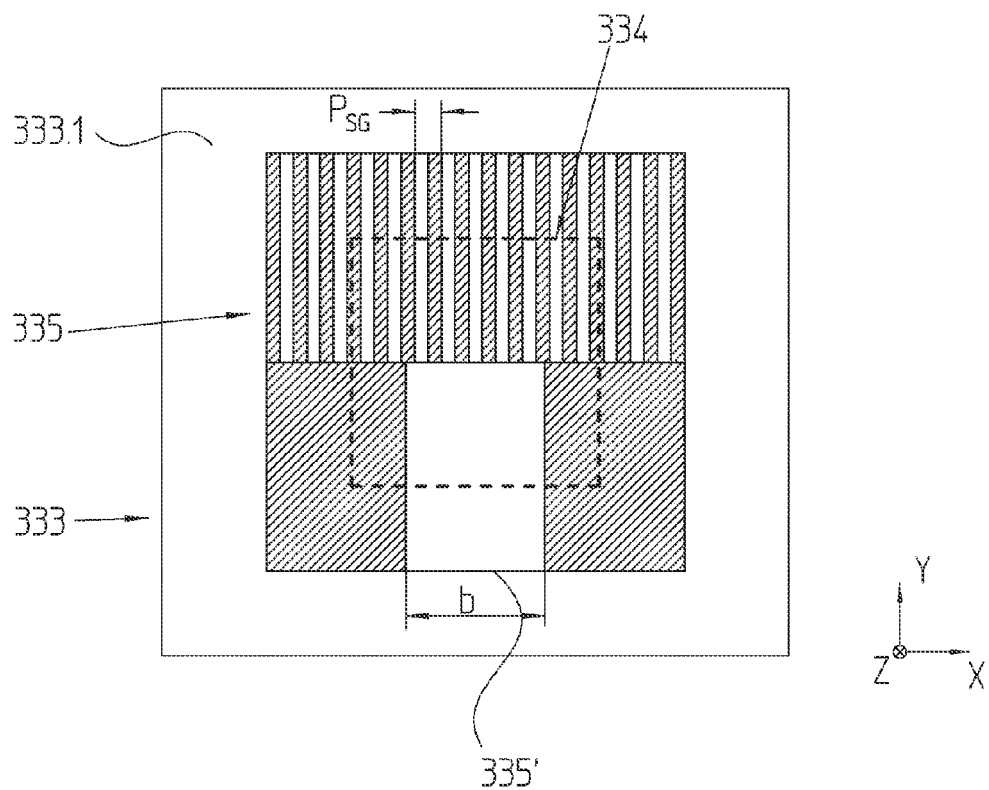

Analogous to the representation in FIG. 3b, a schematic top view of optics module 333 of this example embodiment is shown in FIG. 6b. Reference numeral 335' again denotes a slit, which likewise is effectively integrated at the lower side of optics module 333, and as explained above, is used for scanning the PRC track of the reflection measuring grating.

This example embodiment of optics module 333 is advantageous in particular when, based on the given scanning boundary conditions, no greater expansion of the scanning beam of rays directed toward the reflection measuring grating is necessary.

The measures explained may obviously be used not only in position-measuring devices for detecting linear relative movements, but also in rotary position-measuring devices.

Furthermore, it is also possible to implement only an incremental scanning and to dispense with the PRC scanning mentioned above.

What is claimed is:

1. A position-measuring device, comprising:
   a scanning unit including at least one detector assembly arranged in a detection plane and a primary light source adapted to generate a periodic arrangement of point light sources in said detection plane, the primary light source being arranged above the detection plane; and
   a reflection measuring grating movable relative to the scanning unit in at least one measuring direction;
   a transmitting grating arranged in front of the primary light source in a direction of propagation direction of beams of rays emitted by the primary light source;
   at least one optical element disposed between the transmitting grating and the detector assembly and adapted to image the transmitting grating into the periodic arrangement of point light sources in the detection plane;
   wherein the primary light source is arranged as a spatially extended light source.

2. The position-measuring device according to claim 1, further comprising an optics module arranged in the scanning unit above the detector assembly, the optics module including a transparent carrier substrate, the transmitting grating and the at least one optical element being integrated into the carrier substrate.

3. The position-measuring device according to claim 2, wherein the transmitting grating and the at least one optical element are arranged on at least one of (a) an upper side and (b) a lower side of the carrier substrate.

4. The position-measuring device according to claim 3, wherein the transmitting grating is arranged on the upper side of the carrier substrate, the primary light source, which emits in the direction of the transmitting grating, is arranged above the transmitting grating, and at least one optical element is arranged on the lower side of the carrier substrate.

5. The position-measuring device according to claim 4, wherein at least one further optical element is arranged on the upper side of the carrier substrate in an area which is not occupied by the transmitting grating.

6. The position-measuring device according to claim 3, wherein the carrier substrate is arranged at a defined distance above the detector assembly, the primary light source is arranged between the detector assembly and the carrier substrate and is adapted to emit in a direction of the carrier substrate, the transmitting grating is arranged on the lower side of the carrier substrate, and at least one optical element is arranged on the upper side of the carrier substrate.

7. The position-measuring device according to claim 6, wherein at least one further optical element is arranged on the lower side of the carrier substrate in an area which is not occupied by the transmitting grating.

8. The position-measuring device according to claim 1, wherein the optical element is arranged as at least one of (a) a refractive optical element and (b) a diffractive optical element.

9. The position-measuring device according to claim 8, wherein the optical element is arranged as a grating structure at least one of (a) at the upper side and (b) at the lower side of the carrier substrate.

10. The position-measuring device according to claim 1, wherein imaging of the transmitting grating into a periodic arrangement of point light sources in the detection plane occurs in a central area of the detection plane in which no detector assembly is placed.

11. The position-measuring device according to claim 1, wherein the reflection measuring grating includes a periodic incremental graduation extending in the measuring direction, the transmitting grating is arranged as a periodic grating, and the periodic arrangement of point light sources in the detection plane has a periodicity which corresponds to double a periodicity of the incremental graduation.

12. The position-measuring device according to claim 1, wherein the reflection measuring grating includes a periodic incremental graduation extending in the measuring direction, the transmitting grating is arranged as a periodic grating, and a periodicity of the transmitting grating is selected according to:

$$PSG = 2 \cdot P_M / \beta$$

wherein:
PSG represents the periodicity of the transmitting grating;
$P_M$ represents a periodicity of the incremental graduation; and
β represents an image scale of the optical element.

13. A position-measuring device comprising:
   a scanning unit including at least one detector assembly arranged in a detection plane and a primary light source adapted to generate a periodic arrangement of point light sources in said detection plane, the primary light source being arranged above the detection plane; and
   a reflection measuring grating movable relative to the scanning unit in at least one measuring direction;
   an optics module, made of a transparent carrier substrate, arranged in the scanning unit above the detector assembly, the primary light source, which emits in the direction of the detector assembly, being arranged on an upper side of the carrier substrate; and
   a periodic reflection grating, adapted to form the periodic arrangement of point light sources, arranged in the detection plane;
   wherein the primary light source is arranged as a spatially extended light source.

14. The position-measuring device according to claim 13, wherein the reflection measuring grating includes a periodic incremental graduation extending in the measuring direction, the transmitting grating is arranged as a periodic grating, and the periodic arrangement of point light sources in the detection plane has a periodicity which corresponds to double a periodicity of the incremental graduation.

15. The position-measuring device according to claim 13, wherein the reflection measuring grating includes a periodic incremental graduation extending in the measuring direction, the transmitting grating is arranged as a periodic grating, and a periodicity of the transmitting grating is selected according to:

$$PSG = 2 \cdot P_M / \beta$$

wherein:

PSG represents the periodicity of the transmitting grating;

$P_M$ represents a periodicity of the incremental graduation; and $\beta$ represents an image scale of the optical element.

* * * * *